United States Patent [19]

Rossoll

[11] Patent Number: 5,580,678
[45] Date of Patent: Dec. 3, 1996

[54] ADHESIVE SEALED SOLID ELECTROLYTE CELL HOUSED WITHIN A CERAMIC FRAME AND THE METHOD FOR PRODUCING IT

[75] Inventor: Mary P. Rossoll, Willoughby, Ohio

[73] Assignee: Gould Electronics Inc., Eastlake, Ohio

[21] Appl. No.: 204,779

[22] Filed: Mar. 2, 1994

Related U.S. Application Data

[62] Division of Ser. No. 982,622, Nov. 27, 1992, Pat. No. 5,314,507.

[51] Int. Cl.⁶ ..................... H01M 6/18
[52] U.S. Cl. ............ 429/163; 429/162; 429/191; 429/192
[58] Field of Search ................. 429/191, 192, 429/163, 162, 211, 224, 218, 178, 176, 177

[56] References Cited

U.S. PATENT DOCUMENTS 4,172,319 10/1990 Bloom et al. .
5,041,199 8/1991 DiFranco .
5,085,952 2/1992 North .
5,089,027 2/1992 Rossoll et al. .

*Primary Examiner*—José G. Dees
*Assistant Examiner*—Samuel Barts
*Attorney, Agent, or Firm*—Michael A. Centanni

[57] ABSTRACT

A solid electrolyte cell and method for producing it in which the cell components are assembled within a ceramic frame which is sealed on the top to a first terminal of the cell using an adhesive and sealed on the bottom to a second terminal of the cell using an adhesive and said second terminal having the opposite polarity to that of the first terminal.

4 Claims, 4 Drawing Sheets

ADHESIVE SEALED SOLID ELECTROLYTE CELL HOUSED WITHIN A CERAMIC FRAME AND THE METHOD FOR PRODUCING IT

This application is a division of prior U.S. application: Ser. No. 07/982,622, filing date Nov. 27, 1992 now U.S. Pat. No. 5,314,507.

FIELD OF THE INVENTION

The invention relates to a method for producing a solid electrolyte cell and the cell so produced, specifically a planar solid electrolyte cell housed within a ceramic frame closed at the top surface and bottom surface with conductive terminal sheets using an adhesive material. The cell so produced will have high temperature stability and preferably be hermetically sealed.

BACKGROUND OF THE INVENTION

Ionic conductivity is commonly associated with the flow of ions through a liquid solution of salts. In the vast majority of practical uses of ionic conductors, i.e., as electrolytes for dry cell and sealed lead acid batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization and lowers the output capacity.

Improved microelectronic circuit designs have generally decreased the current requirements for each transistor which makes up the electronic devices. This in turn has enhanced the applicability of solid electrolyte power sources which usually can deliver currents only in the microampere range. These solid electrolyte systems have the inherent advantages of being free of electrolyte leakage, corrosion and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds seeking to find compounds which are solid at room temperature and have specific conductances approaching those exhibited by the commonly used liquid systems. Solid electrolytes must be essentially electronic insulators so as not to internally short the cell while at the same time they must allow for ionic migration if the cell is to operate properly. There are many solid state electrolytes "disclosed" in the art that can be used for solid state cells but many can only operate efficiently at higher temperatures, have low operating voltages or have internal high resistance.

United Kingdom Patent No. 2,201,287B discloses a solid polymer electrolyte for use in solid electrolyte cells which comprises a complex of a solid polymer and an alkali metal salt, which polymer is capable of forming donor-acceptor type bonds with alkali metal ions and is capable of conducting alkali metal ions and wherein the complex is associated with a mixture of more than one substituted or unsubstituted 1,3-dioxolane-2-ones. The preferred mixture recited is ethylene carbonate and propylene carbonate. This solid electrolyte has been found to produce a good lithium solid state cell that can operate at ambient temperature.

U.S. Pat. No. 5,089,027 discloses a method for producing a solid electrolyte cell using the solid electrolyte disclosed in the U.K Patent No. 2,201,287B referred to above. In particular, an adhesive coated frame is deposited on the peripheral area of current collector sheets and the components of the cell are positioned within the frame of adhesive whereupon the current collector sheets are then secured together at the peripheral area containing the adhesive layer.

Several cell applications require that the cell be directly incorporated into a device to produce a portable finished package. This could require the cell to be encapsulated or molded into the device. In injection molding, for example, the cell must be highly planar in appearance and capable of withstanding high temperature processing up to 200° C. These conditions tend to favor the use of a solid electrolyte cell. The polymeric cell components such as the one referred to above, function well at elevated temperatures.

Flat solid electrolyte cells have been assembled typically with an adhesive coated substrate as a spacer and seal. The adhesive generally used has melting points in the range of 80° C. to 105° C. and unfortunately, the seal integrity of the cells is subject to failure at high temperatures.

It is an object of the present invention to provide a method for assembling a solid electrolyte cell within a ceramic frame in which the ceramic frame functions as a housing for the cell components and said frame is sealed to a conductive terminal sheet on each of its top and bottom surfaces using a high temperature adhesive seal.

It is another object of the present invention to provide a method for assembling a solid electrolyte cell within a ceramic frame, said cell employing a solid electrolyte film containing poly(ethylene oxide) or a poly(ethylene oxide) type polymer in conjunction with ethylene carbonate and propylene carbonate.

It is another object of the present invention to provide an adhesive sealed solid electrolyte cell.

The foregoing and additional objects will become more fully apparent from the following description and drawings.

SUMMARY OF THE INVENTION

The invention relates to a method for producing a cell assembled such as a solid electrolyte cell assembly within a ceramic housing comprising the steps:

(a) preparing a first conductive terminal sheet and a second conductive terminal sheet;

(b) forming a ceramic frame defining an opening at the center and having a top surface and a bottom surface;

(c) preparing and assembling at least one cell assembly comprising an anode, a solid electrolyte separator and a cathode into the opening in the frame; closing the top surface frame by securing the first conductive terminal to the top surface of the frame using a high temperature adhesive; closing the frame by securing the second conductive terminal to the bottom surface of the bottom surface of the frame using a high temperature adhesive; and wherein said anode is in electrical contact with one conductive terminal sheet and said cathode is in electrical contact with the other conductive terminal sheet. The invention also relates to the cell so produced.

The high temperature adhesive for use in this invention shall maintain its adhesive characteristics at a temperature of at least 225° C., preferably 250° C. and most preferably at 300° C. Samples of said adhesives are any thermosetting adhesives that will not react with the cell components. Examples of suitable adhesives are phenolic rubber, polyvinyl butyral, epoxy polymers, and ethylene acrylic acid (EEA). Suitable commercial adhesives for use in this invention include a phenolic rubber adhesive available under the tradename Plymaster HT4033 from Norwood Industries Inc.; a polyvinyl butyral adhesive available under the tradename Plymaster PM21 from Norwood Industries, Inc.; and a nylon epoxy adhesive available under the tradename T-1401 from Sheldahl Company. The preferred adhesive is Plymaster HT4033 which is a thermosetting adhesive. Generally, the high temperature adhesive should be able to bond to dissimilar materials (such as ceramic-to-metal) with a high strength and have good resistance to moisture. The adhesive should maintain its bond when exposed to a temperature of 240° C. Although the surfaces of the ceramic frame do not require any surface preparation to be sealed to the conductive sheet using the adhesive, in some applications it may be preferable to treat the surface of the frame to improve its affinity for the adhesive. For example, the surface area of the frame could be corona treated to increase the surface affinity for the adhesive. The thickness of the adhesive layer needed to secure the conductive terminal sheet to the frame can be from 1.0 mil thick to 10 mils or above. Preferably, the thickness should be from 1 mil to 5 mils, and most preferably from 2 mil to 3 mils.

The first and second conductive terminal sheets may be made of any conductive material suitable for functioning as a terminal for the cell. Examples of suitable conductive materials are copper, zinc, nickel, stainless steel, and nickel plated copper.

A ceramic frame, preferably an alumina-containing frame, is prepared with an opening at its center. The width of the top and bottom surfaces of the frame should be sufficient so that when a first conductive terminal sheet is placed on the top surface of the frame and a second conductive terminal sheet is placed on the bottom surface of the frame, the superimposed areas of both conductive terminal sheets on the frame will be sufficient to contain the adhesive layer for securing the sheets to the frame. Preferably, the active components of the cell should not contact the adhesive layer. Once the conductive sheets are secured to the frame, the sheets should preferably provide pressure contact to the anode and cathode components of the cell. Examples of a ceramic frame suitable for use in this invention could be selected from the group consisting of alumina, BeO, SiC, AlN, $Si_3N_4$, $SiO_2$, glass, and mixtures or composites thereof. The preferred ceramic would be an alumina-containing ceramic. The thickness of the ceramic frame should be selected so that when the cell components are placed within the ceramic frame, the cell components will completely fill the frame and extend at least to the surface of the frame or beyond. This will insure good electronic contact between the cell components and the conductive terminals secured to the frame.

The preferred alumina-containing alloys for the ceramic frame would comprise 92% to 99% by weight alumina with 93% to 96% weight alumina being the most preferred. In another embodiment, the top surface and bottom surface of the frame could be coated with a metal or metal alloy to provide a physical bond with the ceramic material while also providing a surface onto which the adhesive can be deposited. Suitable metal coating for the frame would be copper, gold, molybdenum, silver, and platinum. Suitable metal alloys would be a molybdenum-manganese alloy. The preferred initial coating on the frame could be moly-Mg and this coating can be sintered onto the top and bottom surface of the frame. Generally, the metal or metal alloy could be pasted or plated onto the frame surfaces. The primary purpose of the initial coating on the surfaces of the frame is to provide a good physical ceramic to metal bond.

The opening in and the thickness of the ceramic frame will depend on the volume of the components of the cell that will be assembled within the frame. As discussed above, the components of the cell shall at least fill the opening in the frame so that when a conductive terminal is positioned on each side of the frame, each conductive terminal will electrically contact a component of the cell. Preferably the component of the cell should be in pressure contact with the conductive terminals. The configuration of the frame could be square, rectangular, circle or any polygonal shape configuration such as a square frame having an extended tab which could be used as an indexing means. The tab could be an integral part of the unit or a separate part secured to the frame. Preferably, the size of the terminal sheets should be the same as the size of the frame so that when the terminal sheets are placed over the top and bottom surfaces of the frame, they will all be aligned. Thus the size of the opening and the thickness of the frame will be a primary factor in determining the cell's output capacity. In some applications one of the sheets may have an extended tab that could be folded over the other sheet and insulated from the other sheet so that both terminals of the cell could be on the same side. Alternatively, one sheet may be slightly smaller in size than the frame at a selected area so that a through hole could be placed in the uncovered portion of the frame and extend to the sheet on the opposite side. A conductive material, such as copper, conductive epoxy or a conductive eyelet, could be disposed in the opening of the ceramic so that it could make electrical contact with a conductive sheet secured over one side of the frame and extend above the surface of the opposite side of the frame so that both terminals could be on the same side of the cell.

Although many solid electrolytes can be used in this invention, the preferred solid electrolyte separator is one fabricated from a composition of poly(ethylene oxide), referred to hereinafter as PEO, along with a lithium salt, the anion of which may, for example, be $I^-$, $Br^-$, $ClO_4^-$, $SCN^-$, $BF_4^-$, $PF_6^-$ or $CF_3SO_3^-$. Added to this composition is ethylene carbonate and propylene carbonate. It has been found that ethylene carbonate is better than propylene carbonate as an electrolyte solvent because it has a higher electric constant, but has the disadvantage, for use in a liquid system, that it is solid at room temperature. Thus, for solid electrolyte applications, ethylene carbonate would be the desired choice. However, it was discovered in U.S. Pat. No. 5,041,199, that the addition of propylene carbonate along with ethylene carbonate to a poly(ethylene oxide)-containing solid electrolyte will effectively lower the temperature at which the polymer undergoes a transition from an amorphous form to a crystalline form thereby substantially eliminating the presence of a crystalline form of the polymer at temperatures above about 20° C. This composition of a solid electrolyte is excellent for use in a solid electrolyte cell that can function at temperatures of about 20° C and above.

The preferred polymeric solid electrolyte film for use in this invention functions as a physical barrier between the anode and the cathode material, as well as, being ionically conductive at temperatures of 20° C. The preferred composition of the solid electrolyte separator would be PEO-70wt/%$(3EC-1PC)_{20}$ $LiClO_4$. The preferred preparation of the polymeric solid electrolyte would be as follows:

A desired quantity of ethylene carbonate is dissolved with propylene carbonate in a small beaker. The beaker is covered and set aside until the ethylene carbonate is dissolved completely. The beaker may be heated slightly (50° C.) to expedite the process. Dried poly(ethylene oxide) is combined in a high density polyethylene bottle containing ¾ inch diameter ceramic mixing balls with isopropyl alcohol. The solution along with a metal salt, ethylene carbonate, propylene carbonate, and a solvent can then be ball milled for a time period such as 30–45 minutes until a smooth viscous mixture is formed. The mixture can then be set aside for degassing.

The polymeric electrolyte solution can then be cast onto a release paper such as a polyethylene or silicone coated release paper. The film is then allowed to dry for example about 2 hours. The film can then be transferred into a controlled temperature and humidity atmosphere (dry room) to complete the drying cycle. The material should have a moisture content less than about 30, preferably less than about 20 ppm $H_2O$ for battery use. Higher moisture levels result in a tacky film with poor mechanical properties. In addition, a latent reaction between the water and the salt (for example $LiClO_4$), the water and the lithium and/or the water and the solvent may also occur in a sealed cell if the water content is too high.

The molecular weight of the PEO can vary from 600,000 to 5,000,000. The proportions of the EC to PC could vary between 3.4 to 0.5 and 0.5 to 3.5. The amount of the PEO component of the solid electrolyte could vary from 30 to 50 weight percent. Suitable solvents for use in preparing the solid electrolyte could be acetonitrile, methanol, tetrahydrofuran (THF), isopropyl alcohol, dichloromethane and the like.

The cathode material for use in this invention can contain an active cathode material such as manganese dioxide ($MnO_2$), carbon monofluoride, vanadium pentoxide, metal chromate such as silver chromate and silver bismuth chromate and silver vanadium chromate; metal oxide such as nickel oxide, lead oxide, bismuth lead oxide and copper oxides; sulfides such as copper sulfides and iron sulfides; and cadmium. A carbonaceous material, if used, should preferably be carbon. The preferred carbonaceous material is acetylene or furnace black. The cathode material should also contain the same material as the electrolyte such as poly(ethylene oxide) with a lithium salt, the anion of which may, for example, be $I^-$, $Br^-$, $ClO_4^-$, $SCN^-$, $BF_4^-$, $PF_6^-$ or $CF_3SO_3^-$, along with ethylene carbonate and propylene carbonate. The solvent for the cathode could be methanol, trichloroethylene and the like. The preferred preparation of the cathode material would be the following:

A quantity of ethylene carbonate can be dissolved with propylene carbonate in a small beaker. The container could then be covered and set aside until the ethylene carbonate is completely dissolved. The beaker may be heated slightly (50° C.) to expedite the process. Pre-treated manganese dioxide and carbon could be mixed in their dry states in a high density polyethylene bottle with ¾ inch diameter ceramic mixing balls for one hour. Upon completion of the dry blend, a solvent such as methanol can be added. The mix can then be milled for about 1 hour. A second quantity of a solvent such as methanol and dried poly(ethylene oxide) can then be added slowly, alternating between small additions of liquid and dry materials, shaking vigorously between each combination. Next a salt such as a $LiClO_4$ salt can be added and the composition shaken once again. Finally, a second solvent, such as trichloroethylene, the dissolved EC/PC solution and a dispersant such as sorbitan monooleate, can be blended into the previous manganese dioxide-containing mixture and then can be milled for one hour. The composite can then be degassed and cast onto a coated release paper substrate such as polyethylene. The film can be allowed to dry for about 2 hours. The film can be transferred in a controlled temperature and humidity atmosphere (dry room) to complete the drying cycle. The material should have a moisture content less than about 30, preferably less than about 20 ppm $H_2O$ for cell-use. Higher moisture levels result in a tacky film with poor mechanical properties. In addition, a latent reaction between the water and $LiClO_4$, the water and the lithium and/or the water and the solvent may also occur in a sealed cell if the water content is too high.

Additional EC and PC may be added to the cathode material prior to its assembly into a cell to replace any of the EC/PC that may have been lost during the drying step. Also additional EC/PC should be added to facilitate the proper contact with the conductive terminal since EC/PC will make the cathode material somewhat tacky.

The conductive terminal sheet for use in this invention could be copper, nickel, stainless steel or the like, with copper being the preferred current collector and more preferably the copper could be surface treated to enhance its affinity for adhesion to metal alloy solder. For example, the copper could be electrodeposited so that the surface would be roughened. Preferably the thickness of the conductive terminal for most applications could be from 0.0005 to 0.003 inch thick.

The anodes for use in this invention are lithium, lithium alloys, calcium, sodium and potassium with lithium and lithium alloys being the preferred.

The solid electrolyte cell may be encapsulated in various laminates to provide additional protection for the cell. However, if the cell is encapsulated in a film such as a polyamide, mylar or metalized polyethylene film, then provisions should be made so that electrical contact can be made from outside the cell to the conductive terminals of the cell. This could be accomplished by providing an opening in the film thereby exposing a selected area of each of the conductive terminals.

As stated above, the cell of this invention can be encased or encapsulated between layers of a plastic material in which the cell becomes embedded within said material as an integral part of material. Generally, this encapsulation involves a combination of high pressure at elevated temperature of as high as 200° C. The alumina-containing ceramic housing of this invention is capable of withstanding flexural pressures up to 50,000 psi, preferably at least 25,000 psi; compressive strength of 130,000 psi or higher, preferably 300,000 psi; tensile strength of 15,000 psi or higher, preferably 25,000 psi and withstand a temperature of 1300° C., preferably, 1700° C. For example, the cell of this invention could be encapsulated in a printed circuit board so that the printed circuit board along with other electronic components could provide a self-contained power electronic device.

The present invention will become more apparent from the following description thereof when considered therein with the accompanying drawings which are set forth as being exemplary of an embodiment of the present invention and are not intended in any way to be limitative thereof.

DETAILED DESCRIPTION OF THE DRAWINGS

Figure 1A:
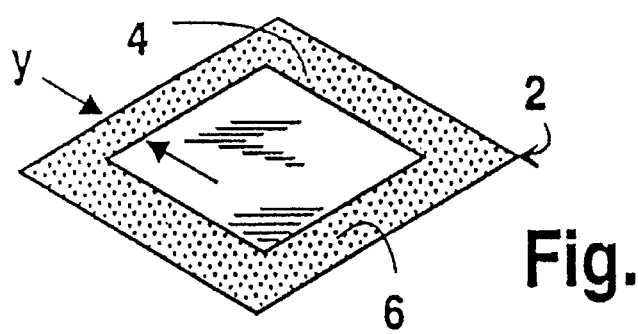
FIG. 1a is perspective view of a copper sheet (terminal) having an adhesive layer at the peripheral area on the top side of the sheet.
Figure 1B:
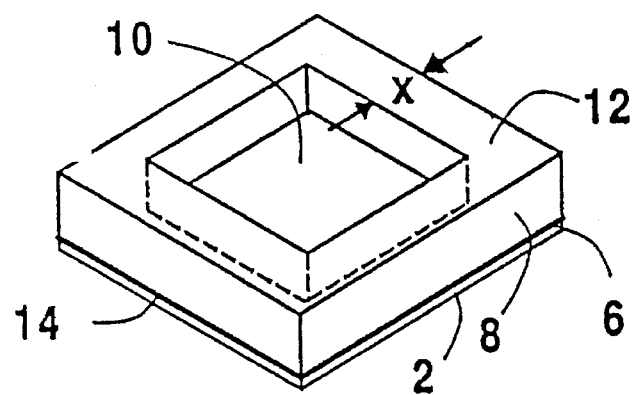
FIG. 1b is a perspective view of a ceramic frame defining an opening at its center and in which the copper sheet of FIG. 1a is secured to the bottom side of the ceramic frame.
Figure 1C:
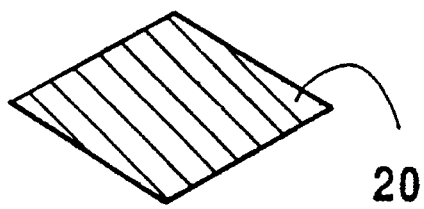
FIG. 1c is a perspective view of an anode sheet for use in the cell of this invention.
Figure 1D:
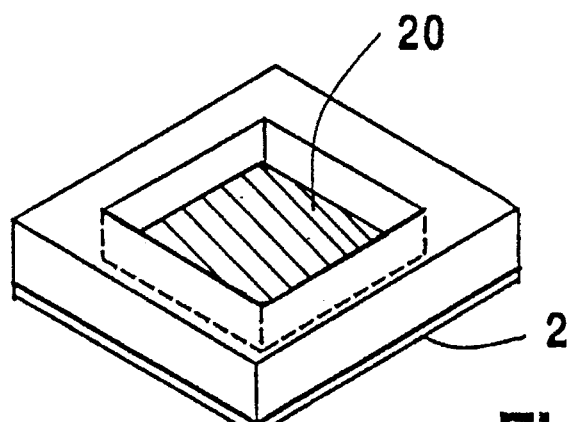
FIG. 1d is a perspective view of the ceramic frame of FIG. 1b in which the anode sheet of FIG. 1c is shown disposed in the opening of the ceramic frame to make contact with the copper sheet.
Figure 1E:
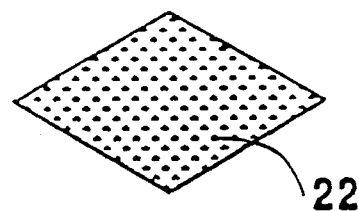
FIG. 1e is a perspective view of a separator for use in the cell of this invention.
Figure 1F:
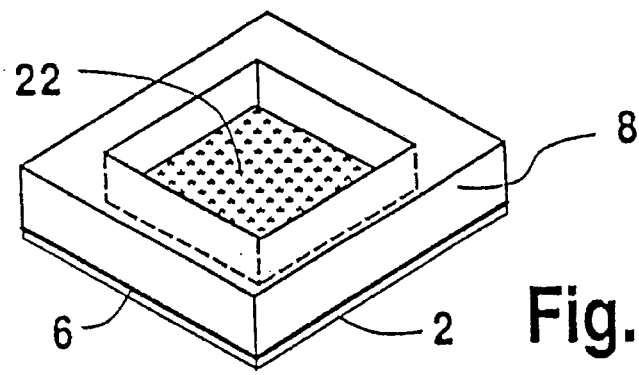
FIG. 1f is a perspective view of the ceramic frame of FIG. 1d in which the separator of FIG. 1e is shown disposed in the opening of the ceramic frame to make contact with the anode.
Figure 1G:
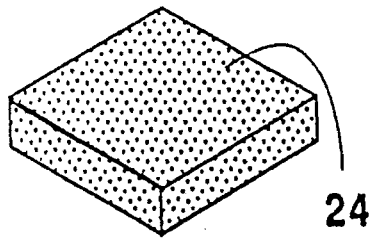
FIG. 1g is a perspective view of a cathode for use in the cell of this invention

FIGS. 1a to 1j show a first conductive terminal sheet 2, preferably copper, onto which is coated an adhesive 6 on one side of terminal sheet 2 at its peripheral area 4. A ceramic frame 8, shown in FIG. 1b, has an opening 10 with a perimeter equal to the perimeter of terminal sheet 2 so that when sheet 2 is superimposed on frame 8, they are completely aligned. The top surface 12 and the bottom surface 14 of ceramic frame 8 are made to accommodate the high temperature adhesive coating on terminals 26 and 2, respectively. The width X of frame 8 is the same as the width Y of sheet 2 so that when frame 8 is placed on sheet 2, the uncovered inner surface of sheet 2 will be free of any high temperature adhesive. With frame 8 aligned onto sheet 2, sheet 2 is secured to frame 8 using an adhesive at an appropriate temperature, pressure and time period. For example, when using Plymaster HT4033 adhesive, sheet 2 could be secured to the frame 8 at a temperature of about 200° C. and with a pressure about 1000 psi for a time period of about 30 seconds. Thereafter an anode 20 (FIG. 1c), preferably lithium, sized slightly smaller than the opening 10 in frame 8 is placed in frame 8 and electrically contacts the surface of sheet 2 as shown in FIG. 1d. If desired, a ram or ultrasonic means could be used to apply pressure to secure contact of the anode 20 to sheet 2. A solid electrolyte separator 22 (FIG. 1e), preferably a PEO separator, is placed within opening 10 of frame 8 over anode 20 as shown in FIG. 1f. Preferably the separator 22 would be slightly larger than opening 10 so that the excess will form a cup-like shape when pressed on top of anode 20 and thereby provide an additional protection against internal shorting along the edges.

Figure 1H:
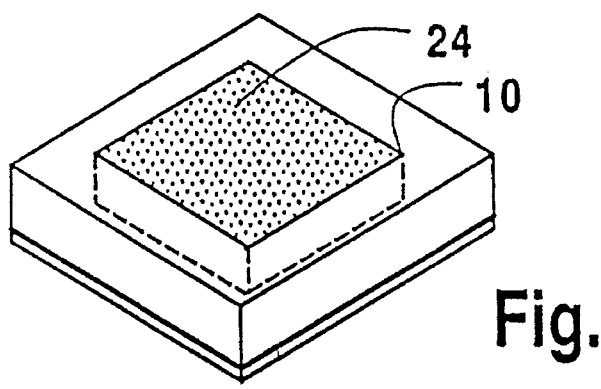
FIG. 1h is a perspective view of the ceramic frame of FIG. 1f in which the cathode of FIG. 1g is shown disposed in the opening of the ceramic frame making contact with the separator.
Figure 1I:
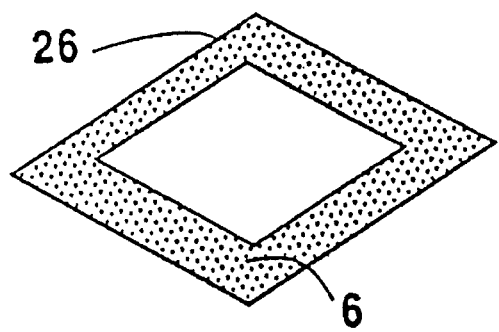
FIG. 1i is a perspective view of a copper sheet (terminal) having an adhesive layer at the peripheral area on the underside of the sheet.
Figure 1J:
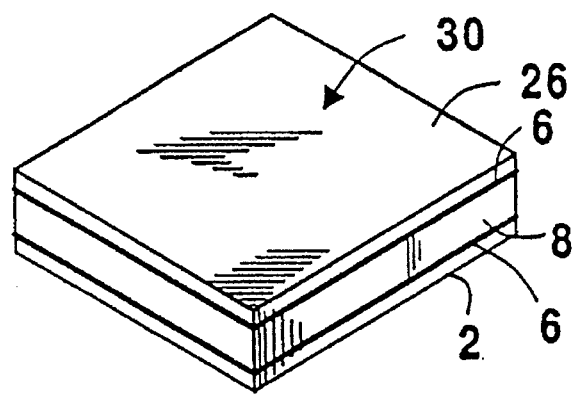
FIG. 1j is a perspective view of the ceramic frame of FIG. 1h in which the copper sheet is secured to the top surface of the ceramic frame making contact with the cathode and producing an assembled cell.

Next a suitable cathode composite 24 sized equal with opening 10 in frame 8 is pressed into opening 10 shown in FIG. 1h. As stated above, it is important that the thickness of anode 20, separator 22 and cathode 24 is sufficient to completely fill the depth of opening 10 in frame 8 in order to insure good contact with the conductive terminal sheets. After assembly of the cathode 24, a second conductive terminal sheet 26, identical to sheet 2 and also having an adhesive layer 6, is placed over frame 8 and sealed to frame 8 in a manner as described above for sheet 2. An assembled cell 30 is now produced as shown in FIG. 1j. Using the method of this invention, a cell can be produced having any desired capacity depending on the volume of the opening in the frame. The cell so produced will be a rigid cell capable of functioning at high temperatures and therefore ideally suited for being encapsulated or molded into various devices, boards, or electronic housings.

Figure 2:
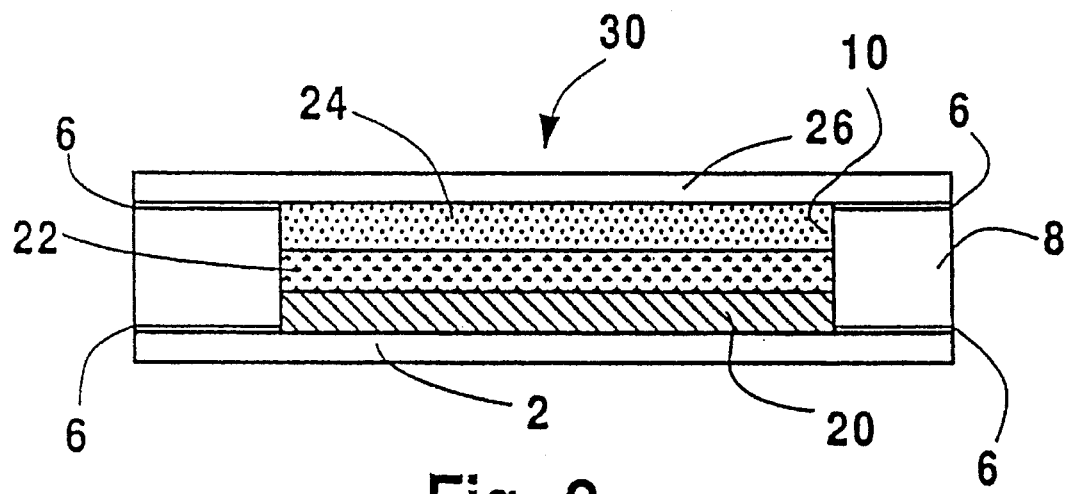
FIG. 2 is a cross-sectional view of a solid electrolyte planar cell produced using the method of this invention and as described in conjunction with FIGS. 1a to 1j.

FIG. 2 shows a cross-sectional view of the solid electrolyte cell 30 produced as described in conjunction with FIGS. 1a to 1j and has identical components identified with the same reference numbers. Specifically, FIG. 2 shows a solid electrolyte cell 30 comprising a cathode material 24, solid electrolyte separator 22 and anode 20 disposed within opening 10 of frame 8. Anode 20 is in pressure and electrical contact with conductive terminal sheet 2 which in turn is secured by adhesive 6 to frame 8. Cathode 24 is shown in pressure and electrical contact with conductive terminal sheet 26 which in turn is secured by adhesive 6 to frame 8.

Figure 3:
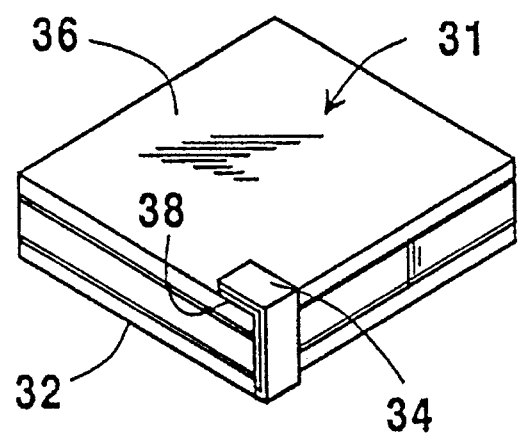
FIG. 3 is a perspective view of an assembled cell of this invention in which the bottom copper terminal has an extended tab folded onto and insulated from the top copper terminal so that both terminals of the cell are on the top side.

FIG. 3 shows an assembled cell 31 in which the bottom conductive terminal 32 has an extended tab 34 which extends over and onto top conductive terminal 36. An insulating material 38 is placed between terminal 36 and tab 34 so that both terminals 36 and 32 are on the top side of the cell.

Figure 4:
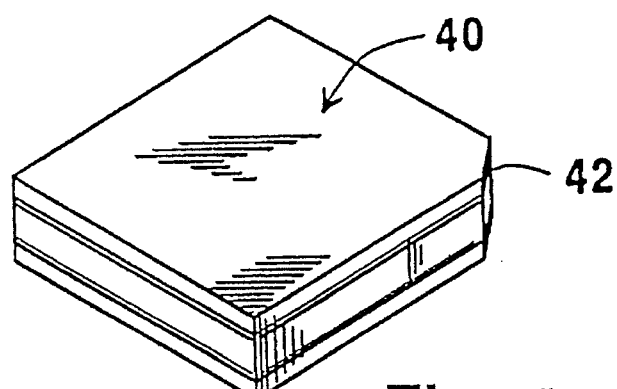
FIG. 4 is a perspective view of an assembled cell of this invention in which one end of the cell is cut off.

FIG. 4 shows an assembled cell 40 in which the end 42 is removed to provide a polarization key for the cell.

Figure 5:
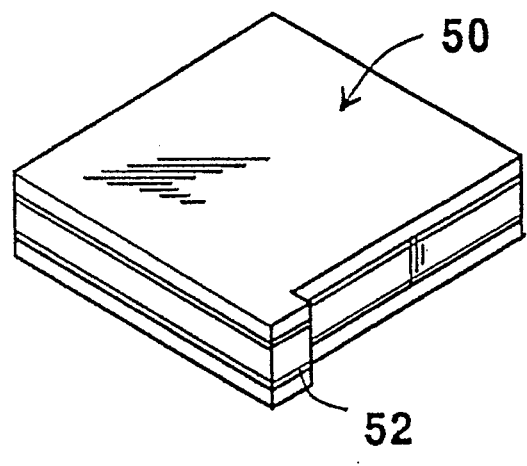
FIG. 5 is a perspective view of an assembled cell of this invention in which a square ceramic frame has an extended protrusion on one of its sides.

FIG. 5 shows an assembled square cell 50 in which one side has an extended protrusion 52 which is adapted to sit within a similar cavity in a battery powered device.

Figure 6:
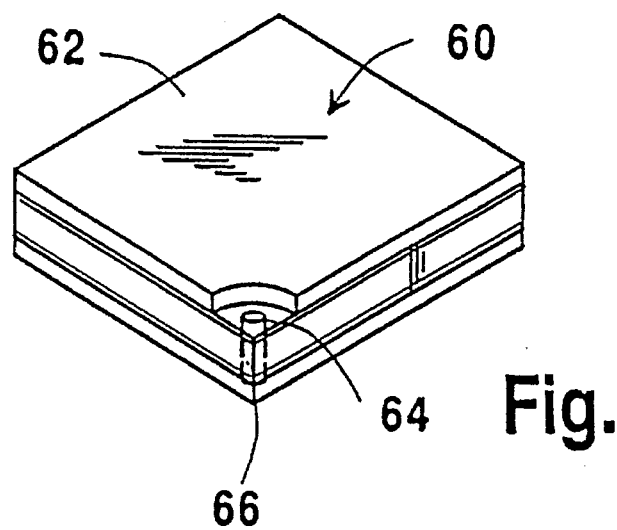
FIG. 6 is a perspective view of an assembled cell of this invention in which the top terminal sheet exposes a selected area of the ceramic frame so that a through hole placed in the ceramic frame contains a conductive material that makes electrical contact with the bottom terminal sheet and extends above the top surface of the ceramic frame so that both terminals of the cell are on the top side.

FIG. 6 shows an assembled cell 60 in which a portion of the top conductive terminal 62 is removed exposing a conductive lined or filled through opening 64 which makes electric contact with conductive terminal 66. Thus, both terminal 60 and terminal 66 are on the top surface of the cell.

The overall assembled cell produced can be used to operate any electrical device designed to operate at the cell's output potential. Although not shown, the cell could be encased in an enclosure such as a plastic enclosure having appropriate openings so that electrical contact could be made to both current collectors. The flat cell so produced occupies only a relatively small space and therefore can accommodate a variety of small battery operated devices. The cell can be fabricated with various output capacities and sizes to accommodate various electrical devices.

EXAMPLE

A sample cell was made using the procedure as described in FIGS. 1a to 1j. The cathode material was made from a composition as follows:
40.0 grams of heat treated manganese dioxide
2.28 grams of heat treated carbon
23.36 grams of ethylene carbonate dissolved with 9.04 grams of propylene carbonate
4.0 grams of $LiClO_4$ salt
15.56 grams of poly(ethylene oxide) (PEO)
240 ml of methanol
320 ml of trichloroethylene
0.24 grams of SPAN 80 which is a trademark for sorbitan monooleate of ICI, Atlas Chemical Division of United States A thin piece of a solid electrolyte (separator) was produced having the following composition:
21.60 grams of a complex of poly(ethylene oxide)
5.16 grams of a lithium salt, $LiClO_4$
37.80 grams of ethylene carbonate
12.60 grams of propylene carbonate
75 ml of isopropyl alcohol
460 ml of acetonitrile A 6 mils thick piece of lithium was used as the anode.

The cell was assembled as described with reference to FIGS. 1a to 1j using a 96% alumina frame. The conductive terminal sheets were copper and coated on their peripheral surface with a thermosetting adhesive (a phenolic rubber) obtained under the tradename Plymaster HT4033. The thickness of the adhesive was 3 mils and the terminal sheets were secured to the frame at a temperature of about 200° C. with an applied pressure of about 1000 psi for about 30 seconds. The open current voltage was 3.45 volts. The closed circuit voltage was 3.43 volts.

It is to be understood that modifications and changes to the preferred embodiment of the invention herein described can be made without departing from the spirit and scope of the invention. For example, bipolar batteries could be constructed to produce higher voltages. For example, in FIG. 2 if two batteries were placed on top of each other with one of the conductive terminals (current collectors) removed, then a bipolar battery would be constructed consisting of a conductive terminal 2, anode 20, separator 22, cathode 24, another conductive terminal 2, if desired, another anode 20, another separator 22, another cathode 24 and a final conductive terminal 26.

What is claimed:

1. A cell comprising a ceramic frame defining an opening and having a top surface and a bottom surface; a first conductive terminal sheet secured by an adhesive to and closing the bottom surface of the frame; a second conductive terminal sheet secured by an adhesive to and closing the top surface of the frame; and an anode, electrolyte and cathode assembly within the opening of the frame and arranged so that the anode makes electrical contact with one conductive terminal sheet and the cathode makes electrical contact with the other conductive terminal sheet.

2. The cell of claim 1 wherein the anode is lithium, and the cathode is $MnO_2$.

3. The cell of claim 1 wherein said top surface and said bottom surface are corona treated surfaces.

4. The cell of claim 1 wherein said top surface and said bottom surface has a metal or metal alloy layer.

* * * * *